3,296,231
LIQUID PHASE PROCESS FOR THE PRODUCTION OF ETHYLENE/N-VINYLLACTAM COPOLYMERS
Raoul Resz and Herbert Bartl, Cologne-Stammheim, Germany, assignors to Farbenfabriken Bayer Aktiengesellschaft, Leverkusen, Germany, a German corporation
No Drawing. Filed May 6, 1964, Ser. No. 365,516
Claims priority, application Germany, May 9, 1963, F 39,691
5 Claims. (Cl. 260—88.1)

It is known that ethylene can be copolymerised with various organic compounds that contain vinyl groups. However, these compounds vary greatly in the readiness with which they form copolymers with ethylene by free radical polymerisation. Only vinyl acetate can be copolymerised in all proportions by radical polymerisation with ethylene to give good yields. Much more difficult is the copolymerisation with higher vinyl esters (such as vinyl benzoate, vinyl butyrate, vinyl stearate, etc.) and with vinyl chloride. Vinyl ethers can be copolymerised with ethylene only in small quantities and acrylic or methacrylic esters only at high pressures. The copolymerisation with ethylene of numerous monomers which otherwise have good polymerisation ability, e.g. styrene, butadiene, isoprene and chloroprene as well as allyl compounds is much more difficult still to carry out.

It has also been proposed that the production of aqueous dispersions of ethylene copolymers by copolymerisation of ethylene with other polymerisable compounds in an aqueous medium may be carried out in the presence of an emulsifier and of a mixture of a temperature resistant azo compound or an organic peroxide and a water-soluble persulphate. Monomers suitable for copolymerisation include, among others, vinyl lactams e.g. vinyl pyrrolidone, vinyl caprolactam and vinyl caprylic lactam. These monomeric compounds are said to be copolymerisable with ethylene in all proportions by the process described there.

On the other hand, it has been found that this process is not suitable for the production of such copolymers of a homogeneous and uniform composition. The products obtained by the method described there are rather mixtures of polymers which may vary very greatly in their composition and properties and are usually incompatible with each other. These conditions are explained with the aid of the comparison experiments given below.

It has now been found that the copolymerization of ethylene with N-vinyl lactams such as N-vinylpyrrolidone, N-vinylcaprolactam, N-vinylpiperidone and similar N-vinylated lactams may, in contrast to the previously known process, be carried out in all proportions with good yields in the presence of free radical-forming compounds such as organic peroxides, decomposable azo compounds or oxygen in solvents in which the two monomers, especially ethylene, are sufficiently soluble. The important condition to be observed is that the organic solvent to be used must be able to dissolve the normally difficultly soluble monomers, namely ethylene i.e. it must be possible to obtain at least about 5 percent solutions of ethylene in the solvent to be used, if necessary under elevated pressure.

Particularly suitable for the copolymerization with ethylene by this process are N-vinylpyrrolidones and, as polymerization medium, primary or tertiary monohydric aliphatic alcohols with 1 to 4 C-atoms such as methyl alcohol, ethyl alcohol and tertiary butanol. The copolymers obtained have various very valuable properties differing according to their composition, so that they can be used in many different fields.

The method of operation employed for polymerization and the use of a suitable reaction medium are important for the properties of the resulting copolymers. The composition of the copolymer is determined by the proportion of vinyl pyrrolidone to ethylene in the reaction vessel. Ethylene and N-vinyllactam are suitably polymerized in proportions between 10:90 and 95:5 at pressures of 20 to 2500 atmospheres and at temperatures of 30 to 250° C. Copolymerisation is generally carried out at a constant ethylene pressure, but it is also possible to add N-vinyllactam continuously during polymerisation. By using solvents that can readily dissolve ethylene, the ethylene pressure required is reduced. By using the solvents indicated above, copolymers of very uniform and homogeneous composition are obtained. These give clear coatings and foils with good mechanical properties. Copolymers with 10 to 95% of N-vinyllactam or 5 to 90% of ethylene may be produced by the process described.

In addition to the N-vinyllactams already mentioned, namely N-vinylpyrrolidone, N-vinylpiperidone and N-vinylcaprolactam, it is also possible to use their derivatives such as N-vinyl-5-methylpyrrolidone, among others, and N-vinyl substituted lactams which contain ether oxygen atoms in the ring, e.g. N-vinyl-3-morpholinone, N-vinyl-2-oxazolidone and their derivatives.

The free radical-forming compounds used may be peroxides such as lauroyl peroxide, benxoyl peroxide, tertiary butyl peroxide, hydrogen peroxide, etc., decomposable diazo compounds such as azo-bis-isobutyronitrile and also oxygen; however it is preferable to use free radical-forming agents which enable polymerisation to be carried out at temperatures between 30 and 100° C. Polymerisation temperatures of 100 to 250° C. may also be used but they favour the formation of coloured polymers and polymers of low molecular weights. The quantities of these polymerisation catalysts employed is usually between 0.05 and 5% preferably 0.1 and 2%, calculated on the mixture of monomers.

The type of solvent used for the solution polymerisation is of great importance for the properties of the ethylene/N-vinyllactam copolymers. The solvents used may be saturated aliphatic or aromatic hydrocarbons liquid at room temperature, e.g. benzine, cyclohexanone, isooctane, benzene, toluene, xylene, monohydric aliphatic saturated alcohols, preferably primary or tertiary alcohols with 1 to 4 C-atoms, e.g. methanol, ethanol, n-propyl-alcohol, but also other aliphatic alcohols such as isopropyl alcohol, tertiary butyl alcohol etc., aliphatic chlorinated hydrocarbons such as methylene chloride and aliphatic esters, ethers and ketones such as ethyl acetate, dioxane, tetrahydrofuran, acetone, etc. However, polymerisation is preferably carried out in a liquid phase consisting predominantly (i.e. to more than 50%) of methyl alcohol, ethyl alcohol or tertiary butanol, because higher yields can thereby be obtained than with other solvents. The liquid phase may also contain 5 to 50% of water (preferably 1–15%). The composition of the polymers produced depends on the solubility of ethylene in the reaction medium employed. Types with high ethylene contents are therefore preferably prepared in tertiary butanol and those with higher N-vinyllactam content in ethyl- or methyl alcohol or in mixtures of the said alcohols with water. Especially the ethylene/N-vinyllactam copolymers produced in liquid phases containing tertiary butanol are distinguished from the copolymers produced in most other solvents by their higher molecular weights and consequently better mechanical properties, e.g. greater tensile strength, better film forming properties and better adhesion to other surfaces.

Depending on the required composition of the copolymer, copolymerisation may be carried out at pressures of 20 to 2500 atmospheres, preferably 1000 atmospheres. In the preparation of copolymers with ethylene contents of 1 to 30%, it is possible to polymerise at pressures of 20 to 200 atmospheres whereas pressures above 200 atmospheres are more suitable for the preparation of types containing more than 30% ethylene.

To modify or improve the properties of ethylene/N-vinyllactam copolymers, other ethylenically unsaturated compounds such as vinyl esters, vinyl chloride, vinyl ethers, acrylic or methacrylic acid esters, maleic acid anhydride, maleic acid esters, maleic acid semiesters, etc., may also be incorporated by polymerisation. However, the compound preferably incorporated by polymerisation is vinyl acetate.

Technically of special interest are ternary polymers composed of ethylene 5–50 percent by weight of N-vinyl pyrrolidone and 10–70 percent by weight of vinyl acetate.

The properties of the polymers prepared by the process described depends to a great extent on their composition. With increasing N-vinyllactam content, the polymers become more hydrophilic and capable of swelling in water but solubility in water does not occur until the ethylene content is below 10 to 15%. The polymers are colourless to yellowish and are glass clear with a N-vinyllactam content above 20 to 30%. They have very good adhesion even to smooth surfaces such as glass or metals. The copolymers in the middle range are rubbery but not sticky masses with, to some extent, good mechanical properties.

Owing to their advantageous properties, ethylene/N-vinyllactam copolymers are suitable for the production of foils, threads and coatings on textiles and paper which are particularly distinguished by their low electrostatic charge. Copolymers with medium N-vinyllactam contents are in addition suitable for the production of artificial leather, safety glass and for sticking wood, metals, glass etc. Products with higher N-vinyllactam contents may be used for the production of photographic layers, as antistatics, adhesives or clarifying agents for aqueous suspensions.

Since various types of ethylene/N-vinyllactam copolymers are readily compatible with other polymers they may be mixed with them, whereby synthetic resins having valuable properties may again be obtained. The following may, for example, be mixed with ethylene/N-vinyllactam copolymers: Polyvinyl chloride, chlorine rubber, cellulose acetate butyrate, nitrocellulose and polyacrylonitrile.

COMPARISON EXPERIMENTS

*Experiment a*

100 parts N-vinylpyrrolidone were stirred in a high pressure autoclave under an ethylene pressure of 120 atmospheres in a mixture of 900 parts water, 4 parts of the sodium salt of a long chained paraffinic sulphonic acid, 1 part azo-bis-isobutyric acid nitrile and 1.5 parts potassium persulphate. This mixture was exposed for 24 hours to ethylene at a constant pressure of 300 atmospheres at 65° C. A dispersion was obtained from which, however, the suspended polymer could be removed by filtration. The finely divided precipitate (yield 105 parts) contained 0.17% nitrogen (=1.3% N-vinylpyrrolidone) and thus consisted of 98.7% of polyethylene.

The filtrate was dialysed against water and completely concentrated by evaporation. The residue was a yellowish hard substance. The result of nitrogen determination was 10.14% nitrogen (=80.5% N-vinylpyrrolidone).

A water-insoluble polymer consisting to 98.7% of polyethylene and a water-soluble polymer consisting to 80.5% of poly-N-vinylpyrrolidone were thus obtained side by side as reaction products.

*Experiment b*

250 parts N-vinylpyrrolidone were stirred in a high pressure autoclave under an ethylene pressure of 120 atmospheres in a mixture of 900 parts water, 20 parts of the sodium salt of a long-chained paraffinic sulphonic acid, 2.5 parts azo-bis-isobutyric acid nitrile and 7.5 parts of potassium persulphate. This mixture was exposed for 24 hours at 65° C. to ethylene at a constant pressure of 300 atmospheres. A finely divided dispersion was obtained from which the dispersed polymer could not be separated by filtration but when left to stand for some time, the dispersed polymer creamed up.

The dispersion was coagulated with methanol and the precipitate was isolated. It contained 0.11% of nitrogen (=0.87% N-vinylpyrrolidone), and thus consisted to over 99% of polyethylene. The filtrate contained a water-soluble polymer consisting predominantly of poly-N-vinylpyrrolidone.

*Experiment c*

100 parts N-vinylcaprolactam, 8 parts of the alkali metal salt of a higher aliphatic sulphonic acid, 0.5 part azo-bis-isobutyric acid nitrile and 1.5 parts of potassium persulphate were emulsified in 900 parts water. The mixture was introduced into a high pressure autoclave, the atmospheric oxygen was displaced by introducing ethylene, and ethylene was thereafter introduced under a pressure of 100 atmospheres into the autoclave. The mixture was heated to 65° C. and the ethylene pressure kept constant at 300 atmospheres. After 24 hours, a yellowish copolymer dispersion was obtained but this was not stable and creamed up after prolonged standing. The dispersion was coagulated by the addition of a large quantity of methanol and precipitate was isolated. It contained 0.11% nitrogen (=1.1% N-vinylcaprolactam), and thus consisted to 98.9% of polyethylene. The filtrate contained a polymer with a nitrogen content of 8.7% and soluble in methanol. Here again polymerisation leads to two fundamentally different polymers with completely different properties.

EXAMPLE 1

2000 parts tertiary butanol and 500 parts N-vinylpyrrolidone are mixed in an autoclave with stirrer and 2.5 parts azo-bis-isobutyronitrile are added. This solution is saturated at 50 atmospheres with ethylene and heated to 65° C. The ethylene pressure is immediately raised to 200 atmospheres and the ethylene is maintained at this pressure for 18 hours.

The reaction product is obtained in the form of a clear, highly viscous solution. For the purpose of isolating it, the polymer is precipitated with water, washed thoroughly with water and reprecipitated from tetrahydrofuran with water. The washed product is dried to a constant weight at 80° C. in a vacuum of 12 mm. Hg.

Analysis gave a nitrogen content of 5.65% which corresponds to an N-vinylpyrrolidone content of 51.0%. Clear films could be cast from a solution in chloroform.

EXAMPLE 2

A solution of 2.5 parts azo-bis-isobutyronitrile in 200 parts tertiary butanol and 500 parts freshly distilled N-vinylpyrrolidone is dissolved in a vessel with stirrer and the mixture is saturated with ethylene at 20° C. and 20 atmospheres. The reaction mixture is then heated to 65° C., the pressure thereby rising to about 30 atmospheres. After 24 hours, the pressure has dropped to 22 to 23 atmospheres. The polymer is isolated from the clear solution by precipitation with petroleum ether, reprecipitated from benzene with petroleum ether, thoroughly washed with petroleum ether and dried in a vacuum at 70° C. The copolymer contained 10.54% nitrogen; this corresponds to an N-vinylpyrrolidone content of 83.7%.

EXAMPLE 3

200 parts tertiary butanol and 300 parts N-vinylcaprolactam are mixed in an autoclave with stirrer and 1.5 parts abo-bis-isobutyronitrile are added. This solution is saturated with ethylene at 70 atmospheres ethylene pressure and heated to 65° C. The pressure is immediately supplemented to 300 atmospheres and maintained at this level for 18 hours by introducing more ethylene under pressure.

The reaction product is a semisolid substance. To isolate it, the reaction mixture is introduced into a large quantity of methanol with stirring, filtered with suction and washed with a large quantity of methanol. The product is dried at 80° C. in a vacuum.

Analysis gave a nitrogen content of 4.45% which corresponds to an N-vinylcaprolactam content of 44.3%.

EXAMPLE 4

2000 parts of an organic solvent given in the table and 500 parts N-vinylpyrrolidone are mixed in an autoclave with stirrer and 2.5 parts azo-bis-isobutyronitrile are added. This solution is saturated with ethylene at 70 atmospheres pressure and heated to 65° C. The ethylene pressure is immediately supplemented to 320 atmospheres and maintained at this value for 18 hours.

The table shows the quantity in atmospheres, of ethylene taken up during polymerisation, the quantity of polymer obtained in parts, and the N-vinylpyrrolidone content of the polymer. This shows that in the cases given here, the yield is highest when polymerisation is carried out in tertiary butanol or in methyl alcohol.

TABLE.—POLYMERISATION OF ETHYLENE WITH VINYLPYRROLIDONE IN VARIOUS SOLVENTS

| Polymerisation medium | Ethylene uptake during polymerisation (in atm.) | Yield (in parts) | Content of incorporated N-vinylpyrrolidone in the polymer (in percent) |
|---|---|---|---|
| Tertiary butanol | 465 | 760 | 53.6 |
| Benzene | 120 | 216 | 57.2 |
| Methanol | 470 | 770 | 49.6 |
| Light petrol (B.P. 60-95° C.) | 190 | 305 | 37.0 |
| Ethyl acetate | 370 | 580 | 47.2 |
| Dioxane | 370 | 595 | 43.1 |
| Methylene chloride | 415 | 665 | 37.0 |

EXAMPLE 5

100 parts of N-vinylpyrrolidone, 400 parts of vinyl acetate and 2000 parts tertiary butanol are stirred with 1.5 parts azo-bis-isobutyronitrile in an autoclave with a stirrer. This solution is then saturated with ethylene at 70 atmospheres pressure, heated to 65° C. and stirred at this temperature for 18 hours. Ethylene is added continuously to maintain the ethylene pressure at 300 atmospheres.

The semi-solid, cold reaction mixture is introduced with stirring into about 5 times its quantity of methyl alcohol, the precipitate formed is filtered off with suction, washed with methyl alcohol and dried in a vacuum cupboard at 80° C.

Analysis gave the composition of the polymer as 31.3% vinyl acetate, 12.7% N-vinylpyrrolidone and 56% ethylene. The product gives clear films cast from chloroform.

EXAMPLE 6

400 parts of tertiary butanol and 100 parts of N-vinylpyrrolidone are mixed in an autoclave with a stirrer and 0.5 part azo-bis-isobutyronitrile are added. This solution is saturated with ethylene at 100 atmospheres pressure, heated to 65° C. and more ethylene added under pressure to raise the pressure to 900 atmospheres and this pressure is maintained for 18 hours. The reaction product is obtained in the form of a flocculent precipitate. This is freed from N-vinylpyrrolidone by washing with water and methyl alcohol and dried at 80° C. in a vacuum at 12 mm. Hg pressure until constant weight.

The reaction product contains 5.52% nitrogen which corresponds to a content of 43.8% of N-vinylpyrrolidone incorporated by polymerisation. When moulded, it is a glass-clear, colorless thermoplastic synthetic resin.

EXAMPLE 7

2000 parts of tertiary butanol, 100 parts of N-vinylpyrrolidone and 1 part of azo-bis-isobutyronitrile are mixed together in an autoclave with stirrer. This solution is saturated with ethylene at 50 atmospheres and heated to 65° C. Immediately on reaching the given temperature, the ethylene pressure is raised to 300 atmospheres and this pressure is maintained for 18 hours. The reaction product is obtained as flocculent precipitate. It is purified by washing with methyl alcohol and dried at 80° C. in a vacuum. The yield is 154 parts of polymer. The reaction product contains 2.58% of nitrogen which corresponds to an N-vinylpyrrolidone content of 20.5%.

Slightly turbid but transparent test samples of homogenous composition are obtained by moulding the copolymer obtained.

EXAMPLE 8

200 parts of tertiary butanol are mixed with 75 parts of N-vinylpyrrolidone and 675 parts of vinyl acetate in an autoclave with a stirrer and 2.25 parts of diisopropyl-peroxy-dicarbonate are dissolved in this mixture. The solution is then saturated with ethylene at 70 atmospheres ethylene pressure and heated to 35° C. The pressure is then immediately raised to 300 atmospheres by introducing more ethylene under pressure and is maintained at this level for 18 hours. The reaction product is obtained in the form of a viscous, clear, colourless solution. It is precipitated by the addition of methyl alcohol, freed from the N-vinylpyrrolidone adhering to it by copious washing with methyl alcohol and dried in a vacuum at 80° C.

810 parts of a clear, elastic polymer were obtained. Analysis gave the following composition:

6.9% of N-vinylpyrrolidone, 45.5% of vinylacetate and 47.6% of ethylene.

EXAMPLE 9

2000 parts of tertiary butanol, 375 parts of N-vinylpyrrolidone and 375 parts of vinyl acetate are mixed in an autoclave with stirrer, 2.25 g. of benoxyl peroxide are dissolved in this mixture and the solution is heated to 80° C. for 18 hours under an ethylene pressure of 30 atmospheres. The resulting clear, viscous solution is worked up as described in Example 8. The yield is 615 parts. The composition of the copolymer was as follows: 37.7% N-vinylpyrrolidone, 27.2% vinyl acetate and 35.1% ethylene.

EXAMPLE 10

200 parts of N-vinylpyrrolidone are dissolved in 10 times the quantity of isooctane and 2 g. of di-tertiary butyl peroxide are stirred into this solution. The solution is then heated to 130° C. for 18 hours under an ethylene pressure of 300 atm. The reaction product is obtained as a yellowish flocculent precipitate which is freed from monomeric N-vinylpyrrolidone by washing with ethyl alcohol and dried in a vacuum at 80° C.

The copolymer contained 35.8% of N-vinylpyrrolidone and 64.2% of ethylene was incorporated by polymerisation. The yield was 188 parts.

What we claim is:

1. A liquid phase process which comprises polymerizing ethylene and N-vinyllactam in proportions of 10:90 to 95:5 at pressures of 20 to 2500 atmospheres and at temperatures of 30 to 250° C. in an organic solvent reaction medium in which ethylene is soluble in an amount of at least 5% by weight.

2. The process of claim 1 wherein said organic solvent reaction medium consists predominantly of an alkanol containing from 1 to 4 carbon atoms.

3. The process of claim 2 wherein said organic solvent reaction medium contains from 5 up to 50% by weight of water.

4. The process of claim 1 wherein said N-vinyllactam is N-vinylpyrrolidone.

5. The process of claim 1 wherein said N-vinyllactam is N-vinylcaprolactam.

References Cited by the Examiner
UNITED STATES PATENTS

| 2,335,454 | 11/1943 | Schuster et al. | 260—80.5 |
| 2,646,425 | 7/1953 | Barry | 260—88.1 |

JOSEPH L. SCHOFER, *Primary Examiner.*

W. HOOVER, *Assistant Examiner.*